(12) United States Patent
Nakai

(10) Patent No.: US 10,965,113 B2
(45) Date of Patent: Mar. 30, 2021

(54) WIRE HARNESS

(71) Applicant: SUMITOMO WIRING SYSTEMS, LTD., Yokkaichi (JP)

(72) Inventor: Hirokazu Nakai, Yokkaichi (JP)

(73) Assignee: Sumitomo Wiring Systems, LTD., Mie (JP)

( * ) Notice: Subject to any disclaimer, the term of this patent is extended or adjusted under 35 U.S.C. 154(b) by 0 days.

(21) Appl. No.: 16/603,913

(22) PCT Filed: Mar. 22, 2018

(86) PCT No.: PCT/JP2018/011322
§ 371 (c)(1),
(2) Date: Oct. 9, 2019

(87) PCT Pub. No.: WO2018/190096
PCT Pub. Date: Oct. 18, 2018

(65) Prior Publication Data
US 2020/0083695 A1    Mar. 12, 2020

(30) Foreign Application Priority Data
Apr. 12, 2017   (JP) .............................. JP2017-078704

(51) Int. Cl.
*H01R 4/18* (2006.01)
*H01R 4/20* (2006.01)
(Continued)

(52) U.S. Cl.
CPC ............. *H02G 15/18* (2013.01); *H01R 4/182* (2013.01); *H01R 4/20* (2013.01); *B60K 6/22* (2013.01);
(Continued)

(58) Field of Classification Search
CPC . B60K 6/22; B60L 2270/147; B60R 16/0215; B60Y 2200/91; B60Y 2200/92;
(Continued)

(56) References Cited

U.S. PATENT DOCUMENTS 2,930,835 A * 3/1960 Bollmeier .............. H02G 15/24
174/76
3,060,069 A * 10/1962 Sindars ................. F16L 59/022
138/120
(Continued)

FOREIGN PATENT DOCUMENTS

| JP | 2006-156051 A | 6/2006 |
| JP | 2016-58137 A | 4/2016 |
| JP | 2016-197974 A | 11/2016 |

OTHER PUBLICATIONS

AFL-Substation-Bus-Conductors_pp. 611-634 _2011.*
(Continued)

*Primary Examiner* — Timothy J Thompson
*Assistant Examiner* — Guillermo J Egoavil
(74) *Attorney, Agent, or Firm* — Oliff PLC

(57) ABSTRACT

A wire harness, in which a connection portion between a shape retaining conductor and a flexible conductor can be protected, includes a flexible conductor that is flexibly bendable, a shape retaining conductor that retains its shape, and a protective member that surrounds a connection portion between the flexible conductor and the shape retaining conductor and linearly holds the connection portion, and one end portion of the protective member is fixed to an end portion of the shape retaining conductor.

4 Claims, 3 Drawing Sheets

(51) Int. Cl.
  *H02G 15/18* (2006.01)
  *B60K 6/22* (2007.10)
  *B60R 16/02* (2006.01)
(52) U.S. Cl.
  CPC ....... *B60R 16/0215* (2013.01); *B60Y 2200/91* (2013.01); *B60Y 2200/92* (2013.01)
(58) Field of Classification Search
  CPC ........ H01B 7/00; H01B 7/0045; H01R 4/182; H01R 4/20; H01R 4/203; H01R 4/18; H01R 9/0503; H02G 3/0462; H02G 15/18
  USPC .............................................. 174/70 R, 72 A
  See application file for complete search history.

(56) References Cited

U.S. PATENT DOCUMENTS

| | | | | |
|---|---|---|---|---|
| 5,235,137 | A | * 8/1993 | Jones | F16L 11/127 174/101.5 |
| 2006/0278423 | A1 | * 12/2006 | Ichikawa | H02G 3/0462 174/72 A |
| 2011/0177727 | A1 | * 7/2011 | Zhao | H01R 4/72 439/874 |
| 2012/0305308 | A1 | * 12/2012 | Toyama | B60R 16/0207 174/70 R |
| 2014/0377991 | A1 | * 12/2014 | Kawamura | H01R 4/187 439/604 |
| 2016/0059802 | A1 | * 3/2016 | Kanagawa | B60R 16/0215 174/68.3 |
| 2016/0071630 | A1 | | 3/2016 | Sugino |
| 2016/0336097 | A1 | * 11/2016 | Sakagami | H02G 15/013 |
| 2017/0093456 | A1 | * 3/2017 | Decker | H02J 50/12 |
| 2017/0126084 | A1 | * 5/2017 | Schweinert | H02K 9/193 |
| 2018/0114612 | A1 | | 4/2018 | Itani et al. |
| 2018/0175596 | A1 | * 6/2018 | Sugino | H01B 7/0045 |

OTHER PUBLICATIONS

Lightni3_W P Armstrong_p. 1_2009.*
Apr. 24, 2018 International Search Report issued in International Patent Application No. PCT/JP2018/011322.

* cited by examiner

WIRE HARNESS

The present disclosure relates to a wire harness.

BACKGROUND

It is conventionally known to use, in a wire harness that is installed in a vehicle such as a hybrid automobile or an electric automobile, a shape retaining conductor that retains its shape in a portion where flexibility is not required when the wire harness is installed in the vehicle and to use a flexible conductor that is flexibly bendable in a portion where flexibility is required for connection to an apparatus or the like. If the shape retaining conductor and the flexible conductor are used in appropriate portions, space utilization can be increased and the cost can be reduced, for example.

For example, Patent Document 1 below discloses a wire harness in which a single core wire is used as a shape retaining conductor and a twisted wire is used as a flexible conductor. In this wire harness, as a result of the single core wire that has a smaller diameter than the twisted wire being inserted through a shield pipe, the diameter of the shield pipe can be reduced. The single core wire and the twisted wire are joined together through ultrasonic welding in a state where a conductor that is exposed from an insulating covering at an end portion of the single core wire and a conductor that is exposed from an insulating covering at an end portion of the twisted wire overlap each other in a direction that crosses an extension direction of these wires. The conductor of the single core wire is crushed into the shape of a flat plate and the conductor of the twisted wire is joined to the thus formed flat surface. The width of the crushed portion having the shape of a flat plate is larger than the outer diameter of the single core wire, and therefore the crushed portion cannot be accommodated within the shield pipe through which the single core wire extends. Therefore, a connection portion between the single core wire and the twisted wire is disposed outside an end of the shield pipe.

CITATION LIST

Patent Documents

Patent Document 1: JP 2016-58137A

SUMMARY

However, in the above configuration, the connection portion between the single core wire and the twisted wire may bend while the wire harness is being transported or being installed in a vehicle, for example. If the connection portion bends, there is a concern that problems may occur such as contact resistance of the connection portion deviating from a normal value due to stress caused by bending.

The present disclosure was completed under the above circumstances, and an object of some preferred embodiments is to provide a wire harness in which a connection portion between a shape retaining conductor and a flexible conductor can be protected.

A wire harness according to one aspect of the present disclosure includes a flexible conductor that is flexibly bendable, a shape retaining conductor that retains its shape, and a protective member that surrounds a connection portion between the flexible conductor and the shape retaining conductor and linearly holds the connection portion, wherein one end portion of the protective member is fixed to an end portion of the shape retaining conductor.

A wire harness according to another aspect of the present disclosure includes a flexible conductor that is flexibly bendable, a shape retaining conductor that retains its shape, a shield pipe through which the shape retaining conductor extends, and a protective member that surrounds a connection portion between the flexible conductor and the shape retaining conductor and linearly holds the connection portion, wherein one end portion of the protective member is fixed to an end portion of the shield pipe.

Advantageous Effects

According to certain aspects of the present disclosure, bending of a connection portion between a flexible conductor and a shape retaining conductor can be prevented, and thus the connection portion can be protected.

DESCRIPTION OF EMBODIMENTS

The following describes preferred embodiments of the present disclosure.

The wire harness of the present embodiments may be configured such that the protective member is made of metal, the wire harness includes an insulating member (insulator) that surrounds the protective member, and the insulating member collectively covers entire lengths of the protective member and the shape retaining conductor. In this configuration, the insulating member surrounding the protective member also serves as a covering member for the shape retaining conductor, and therefore the number of parts and the number of man-hours can be reduced compared to a case where the insulating member for the protective member and the covering member for the shape retaining conductor are provided as separate members.

The wire harness of preferred embodiments may be configured such that the wire harness includes a flexible shield member that surrounds the flexible conductor, and an end portion of the flexible shield member is fixed to the end portion of the shield pipe together with the one end portion of the protective member. With this configuration, caulking does not need to be performed using a caulking ring or the like to connect the end portion of the flexible shield member to the end portion of the shield pipe, and therefore the number of parts and the number of man-hours can be reduced.

First Embodiment

Figure 1:
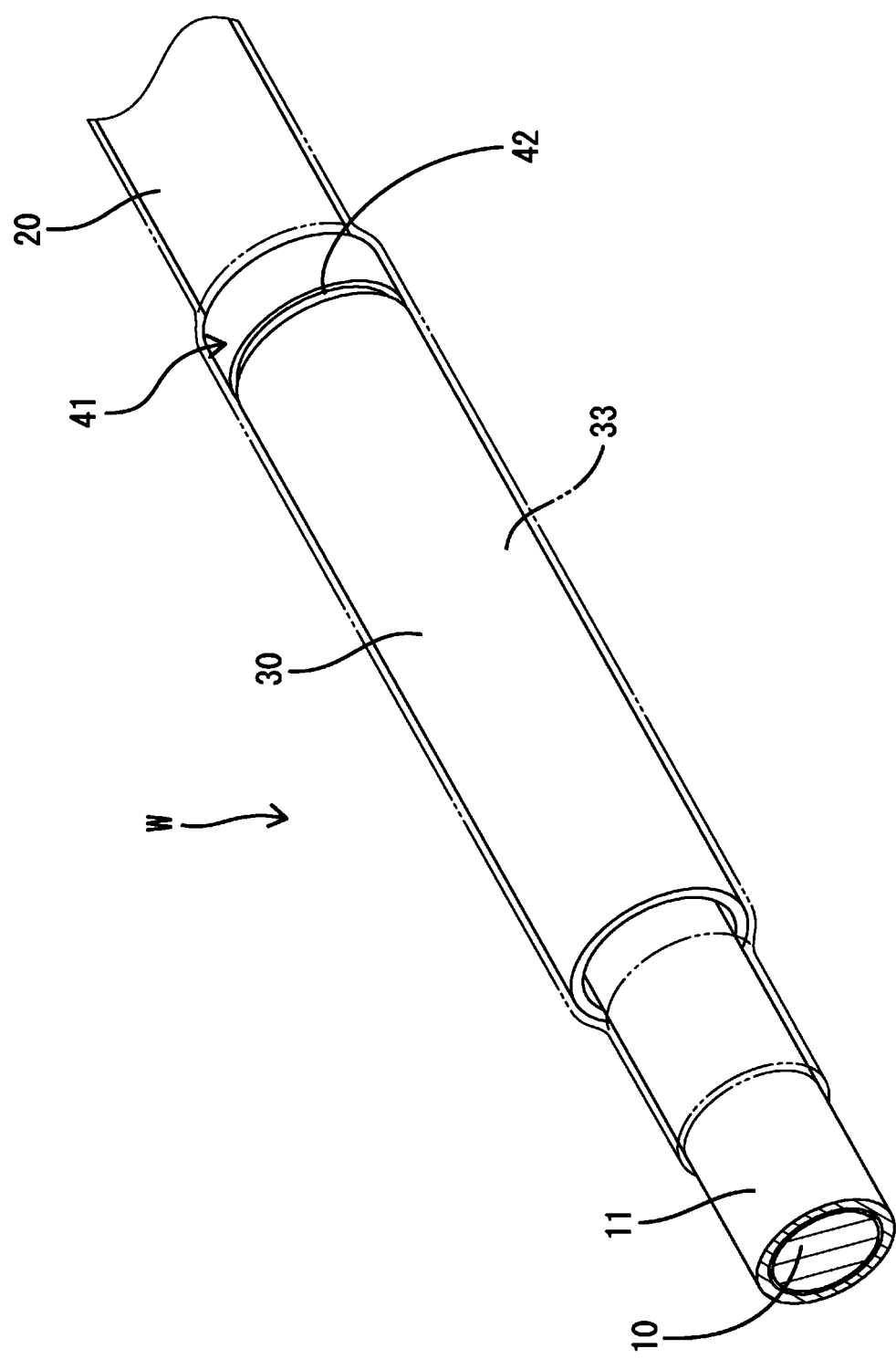
FIG. 1 is an enlarged partial perspective view of a wire harness according to a first embodiment showing a connection portion.
Figure 2:
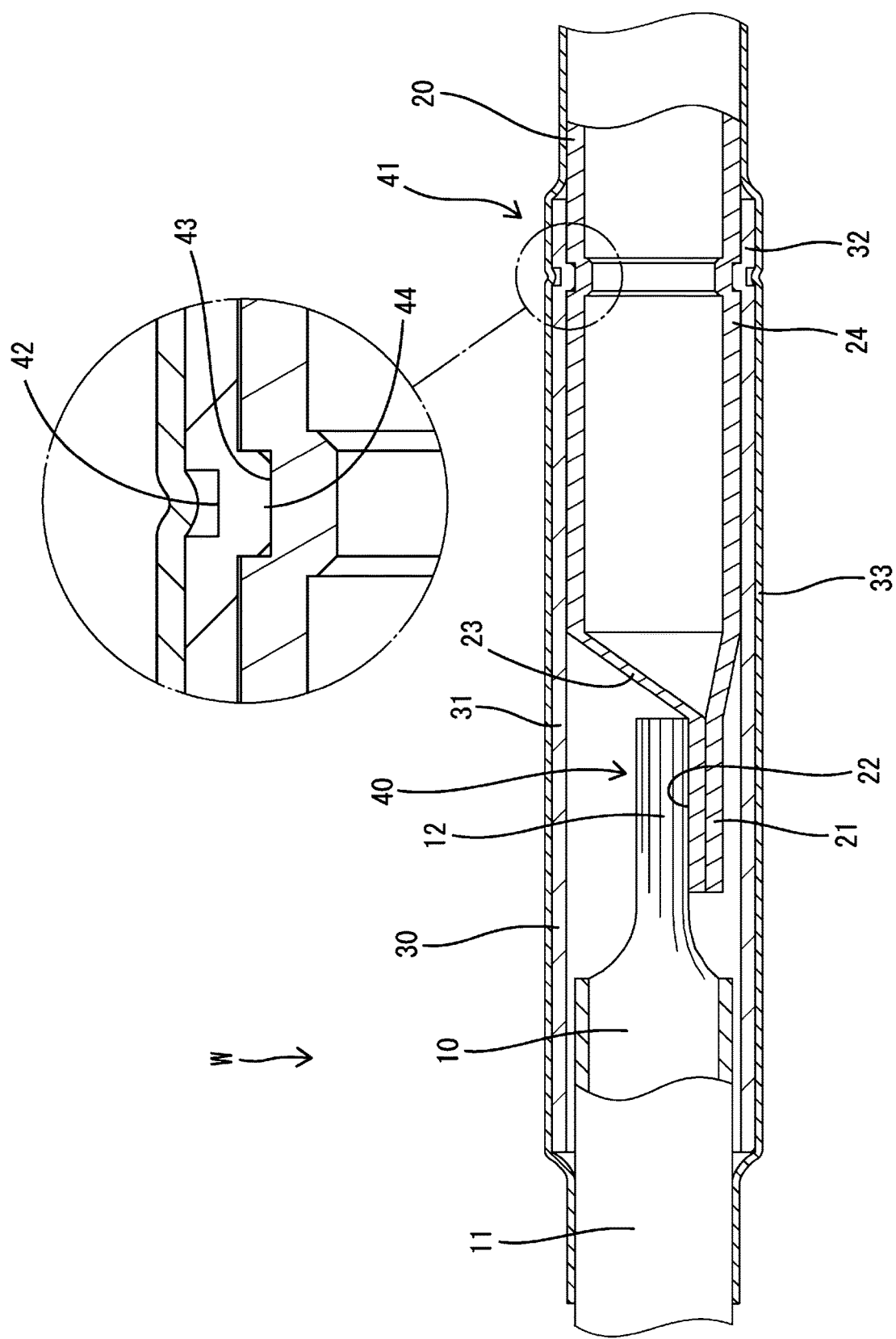
FIG. 2 is an enlarged cross-sectional view of the connection portion.

The following describes one specific embodiment in detail with reference to FIGS. 1 and 2.

A wire harness of this embodiment is installed in a vehicle such as a hybrid automobile and is connected between an apparatus that is installed in a front portion of the vehicle and an apparatus that is installed in a rear portion of the vehicle. The wire harness of this embodiment includes a plurality of conductive wires W (only one of them is illustrated).

Each of the conductive wires W has a configuration in which a flexible conductor 10 that is flexibly bendable and a shape retaining conductor 20 that retains its shape are connected to each other in a longitudinal direction. In the conductive wire W, the shape retaining conductor 20 is used in a portion that is disposed under the floor of the vehicle body and the flexible conductor 10 is used in a portion that is disposed within the vehicle cabin, for example. The conductors of the conductive wire W are made of metal (for example, aluminum, an aluminum alloy, copper, a copper alloy, or the like) and have a substantially circular cross-sectional shape.

The flexible conductor 10 is a twisted wire conductor that is obtained by twisting together a plurality of metal strands, and is surrounded by an insulating covering 11.

The shape retaining conductor 20 is a pipe conductor that is constituted by a single hollow metal pipe. The outer diameter of the shape retaining conductor 20 is slightly larger than the outer diameter of the flexible conductor 10.

The conductive wire W includes a connection portion 40 at which the flexible conductor 10 and the shape retaining conductor 20 are connected to each other. The flexible conductor 10 and the shape retaining conductor 20 are joined together in a state where an end portion of the flexible conductor 10 and an end portion of the shape retaining conductor 20 overlap each other in a direction that crosses an extension direction of the conductive wire W.

The end portion of the shape retaining conductor 20 includes a connection portion (hereinafter referred to as a "shape retaining conductor-side connection portion 21") that is crushed into the shape of a flat plate. The shape retaining conductor-side connection portion 21 is crushed such that both ends of the shape retaining conductor 20 in the radial direction come into close contact with each other. The shape retaining conductor-side connection portion 21 is arranged on one end side of the shape retaining conductor 20 in the radial direction, and the entire shape retaining conductor-side connection portion 21 is located on one side of a center line of the shape retaining conductor 20. The shape retaining conductor-side connection portion 21 is substantially parallel to the center line of the shape retaining conductor 20. A surface of the shape retaining conductor-side connection portion 21 that faces the center line of the shape retaining conductor 20 serves as a joint surface 22 to which the flexible conductor 10 is to be joined. The joint surface 22 is a flat surface.

As a result of the shape retaining conductor-side connection portion 21 being formed, a step portion 23 is formed at the end portion of the shape retaining conductor 20. The step portion 23 forms a step that is larger than approximately half of the diameter of the shape retaining conductor 20.

The end portion of the shape retaining conductor 20 also includes a fixation portion 24 to which an end portion of a protective member 30, which will be described later, is fixed. The fixation portion 24 is adjacent to the step portion 23 and has a substantially constant outer diameter. The fixation portion 24 is fitted inside a fixing portion 32 of the protective member 30.

The end portion of the flexible conductor 10 includes a connection portion (hereinafter referred to as a "flexible conductor-side connection portion 12") that is formed by welding strands together into the shape of a block. The flexible conductor-side connection portion 12 has the shape of a flat substantially rectangular parallelepiped. The flexible conductor-side connection portion 12 is located at the center of the flexible conductor 10 in the radial direction, and steps are formed on both sides thereof (above and below in FIG. 2) in the radial direction.

The flexible conductor-side connection portion 12 is overlaid on the joint surface 22 of the shape retaining conductor-side connection portion 21 and these are joined together using an ultrasonic welder, for example. Through this ultrasonic welding, a metal-metal joint is formed at a contact portion between the flexible conductor 10 and the shape retaining conductor 20 and electrical connection is realized. In the state where the flexible conductor-side connection portion 12 and the shape retaining conductor-side connection portion 21 are joined together, the center line of the flexible conductor 10 and the center line of the shape retaining conductor 20 are located substantially on the same axis.

The wire harness includes the protective member 30 that surrounds the connection portion 40 between the flexible conductor 10 and the shape retaining conductor 20 and linearly holds the connection portion 40, and one end portion of the protective member 30 is fixed to an end portion of the shape retaining conductor 20.

The protective member 30 is a tubular member (pipe) that is made of metal (an aluminum alloy, a copper alloy, stainless steel, or the like), and includes a surrounding portion 31 that surrounds the connection portion 40 and the fixing portion 32 that is fixed to the fixation portion 24 of the shape retaining conductor 20. The protective member 30 has a linear shape and a circular cross-sectional shape with a substantially constant diameter over the entire length thereof.

The fixing portion 32 of the protective member 30 is provided at one end portion of the protective member 30 in the axial direction. The fixing portion 32 has an inner diameter that is larger than an outer diameter of the fixation portion 24, and covers an outer surface of the fixation portion 24.

The protective member 30 and the shape retaining conductor 20 are fixed to each other as a result of plastic working being performed on a part of a portion (hereinafter referred to as a "joint portion 41") in which the fixing portion 32 of the protective member 30 overlaps the fixation portion 24 of the shape retaining conductor 20. In the following description, the part (fixed part) of the joint portion 41 that is subjected to plastic working will be referred to as a fixed portion 42.

The fixed portion 42 is located on one end side of the protective member 30 in the axial direction and is spaced apart from the connection portion 40 by a predetermined distance. The fixed portion 42 is provided at one position of the joint portion 41.

The fixed portion 42 is plastically deformed such that its outer surface is recessed and its inner surface protrudes as a result of the joint portion 41 being pressed from the outside toward the inside in the radial direction using a tool. The fixed portion 42 has the shape of a groove that is continuous in the circumferential direction of the joint portion 41. The fixed portion 42 is formed by pressing the entire circumference of the joint portion 41 from the outside in the radial direction.

In the fixed portion 42, the fixing portion 32 of the protective member 30 and the fixation portion 24 of the shape retaining conductor 20 are both compressed in a radially inward direction such that their outer circumferential surfaces are recessed and their inner circumferential surfaces protrude. In the fixed portion 42, a protruding portion 44 of the inner circumferential surface of the protective member 30 is fitted into (enters) a recessed portion 43 of the outer circumferential surface of the shape retaining conductor 20 and is locked in the axial direction.

The protective member 30 is covered with an insulating member 33. The insulating member 33 is a shrinkable tube or the like and covers the entire length of the protective member 30. The insulating member 33 is long enough to surround not only the protective member 30 but also the entire length of the shape retaining conductor 20. The insulating member 33 collectively covers the entire lengths of the protective member 30 and the shape retaining conductor 20 and also serves as a covering member for the shape retaining conductor 20. The insulating member 33 is in close contact with outer circumferential surfaces of the protective member 30 and the shape retaining conductor 20. It should be noted that one end of the insulating member 33 covers the insulating covering 11 of the flexible conductor 10.

The following describes functions and effects of the embodiment configured as described above.

The wire harness of this embodiment includes the flexible conductor 10 that is flexibly bendable, the shape retaining conductor 20 that retains its shape, and the protective member 30 that surrounds the connection portion 40 between the flexible conductor 10 and the shape retaining conductor 20 and linearly holds the connection portion 40, and one end portion of the protective member 30 is fixed to an end portion of the shape retaining conductor 20. With this configuration, bending of the connection portion 40 between the flexible conductor 10 and the shape retaining conductor 20 can be prevented, and thus the connection portion 40 can be protected.

Furthermore, the protective member 30 is made of metal, the wire harness includes the insulating member 33 that surrounds the protective member 30, and the insulating member 33 collectively covers the entire lengths of the protective member 30 and the shape retaining conductor 20. In this configuration, the insulating member 33 surrounding the protective member 30 also serves as the covering member for the shape retaining conductor 20, and therefore the number of parts and the number of man-hours can be reduced compared to a case where the insulating member 33 for the protective member 30 and the covering member for the shape retaining conductor 20 are provided as separate members.

Second Embodiment

Figure 3:
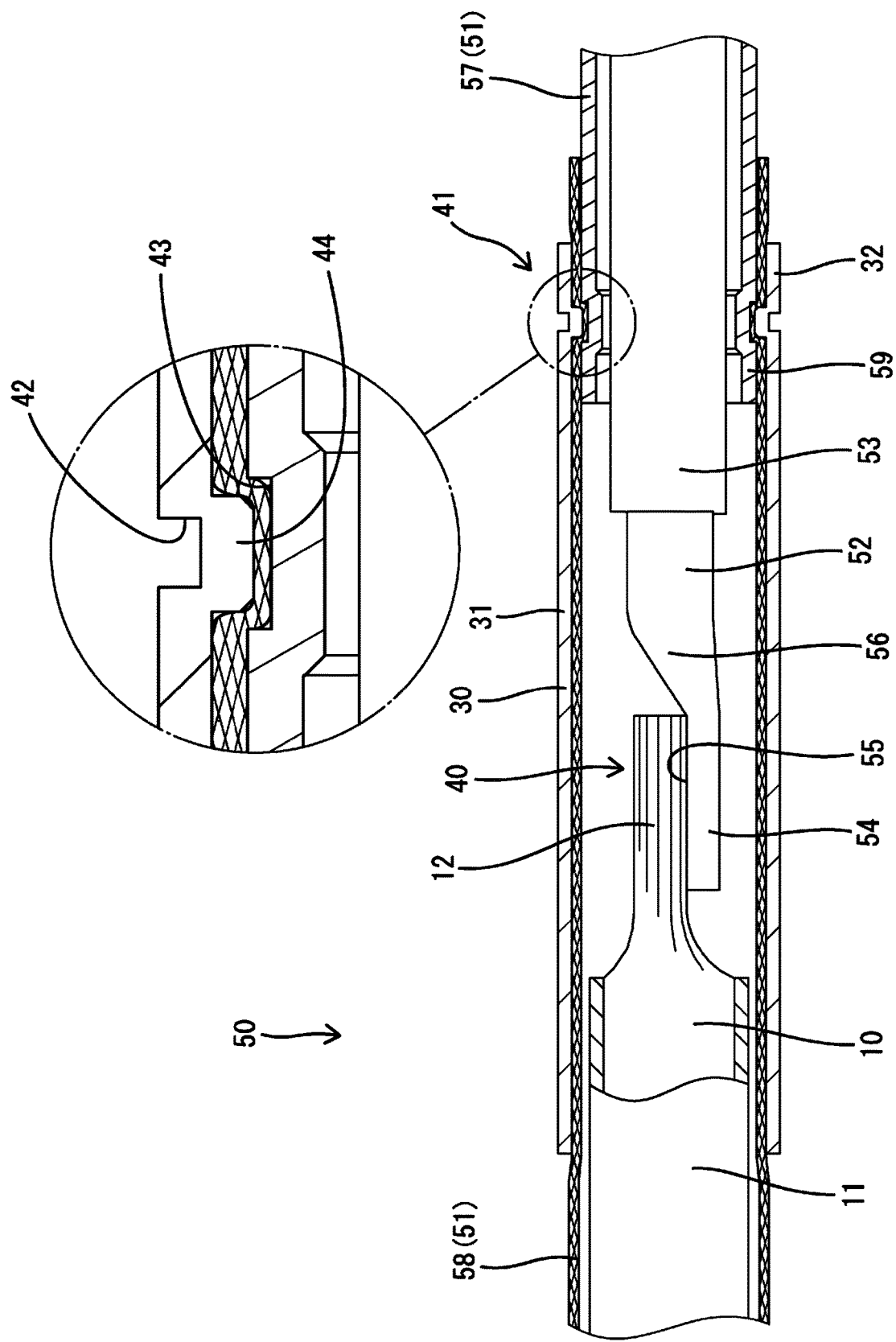
FIG. 3 is an enlarged cross-sectional view of a connection portion of a wire harness according a second embodiment.

The following describes, with reference to FIG. 3, a wire harness according to a second embodiment.

The wire harness of this embodiment differs from that of the first embodiment in that a shield member 51 that surrounds a conductive wire 50 is provided. It should be noted that structures that are similar to those of the first embodiment are denoted with the same reference signs as those used in the first embodiment and a redundant description is omitted.

Like the first embodiment, the wire harness according to this embodiment includes a conductive wire 50 that has a configuration in which a flexible conductor 10 that is flexibly bendable and a shape retaining conductor 52 that retains its shape are connected to each other in a longitudinal direction.

The shape retaining conductor 52 is a single core conductor that is constituted by a single solid metal rod, and is surrounded by an insulating covering 53. The shape retaining conductor 52 has an outer diameter that is slightly smaller than an outer diameter of the flexible conductor 10.

Like the first embodiment, an end portion of the shape retaining conductor 52 includes a shape retaining conductor-side connection portion 54 that is crushed into the shape of a flat plate. Like the first embodiment, the shape retaining conductor-side connection portion 54 is arranged on one end side of the shape retaining conductor 52 in the radial direction, and a surface of the shape retaining conductor-side connection portion 54 that faces a center line of the shape retaining conductor 52 serves as a joint surface 55 to which the flexible conductor 10 is to be joined. It should be noted that, like the first embodiment, a step portion 56 is formed at the end portion of the shape retaining conductor 52 as a result of the shape retaining conductor-side connection portion 54 being formed.

Like the first embodiment, the flexible conductor 10 is a twisted wire conductor that is obtained by twisting together a plurality of metal strands, and is surrounded by an insulating covering 11.

Like the first embodiment, the wire harness includes a protective member 30 that surrounds a connection portion 40 between the flexible conductor 10 and the shape retaining conductor 52 and linearly holds the connection portion 40. Like the first embodiment, the protective member 30 is a tubular member (pipe) that is made of metal (for example, an aluminum alloy, a copper alloy, stainless steel, or the like), and includes a surrounding portion 31 that surrounds the connection portion 40 and a fixing portion 32 that is fixed to a fixation portion 59 of a shield pipe 57, which will be described below. The fixing portion 32 has an inner diameter that is larger than an outer diameter of the fixation portion 59 and covers an outer surface of the fixation portion 59.

The shield member 51 includes the shield pipe 57 that surrounds the shape retaining conductor 52 and a flexible shield member 58 that surrounds the flexible conductor 10.

The shield pipe 57 is constituted by an elongated pipe that is made of metal (for example, aluminum or an aluminum alloy). The shield pipe 57 has a circular cross-sectional shape so that the shape retaining conductor 52 can be inserted through the inside of the shield pipe. The diameter of the shield pipe 57 can be reduced because the portion of the conductive wire 50 that is inserted through the inside of the shield pipe 57 is the shape retaining conductor 52 that has a smaller diameter than the flexible conductor 10. The connection portion 40 between the flexible conductor 10 and the shape retaining conductor 52 is disposed at a position that is outside the shield pipe 57 and is spaced apart from an end of the shield pipe.

Most of the shield pipe 57 extends in the front-rear direction under the floor of the vehicle, and both ends of the shield pipe 57 in the front-rear direction are disposed within the vehicle cabin. The shield pipe 57 is bent so as to extend along a predetermined piping route.

An end portion of the shield pipe 57 includes the fixation portion 59 to which an end portion of the protective member 30 is fixed. The fixation portion 59 is fitted inside the fixing portion 32 of the protective member 30.

The flexible shield member 58 is, for example, a braided member that is obtained by braiding conductive metal strands into a tubular shape, for example, and has favorable bendability. The flexible shield member 58 is fixed to the end portion of the shield pipe 57 together with the protective member 30.

An end portion of the flexible shield member 58 is sandwiched in a joint portion 41 in which the fixing portion 32 of the protective member 30 overlaps the fixation portion 59 of the shield pipe 57. Like the first embodiment, the protective member 30 and the shield pipe 57 are fixed to each other as a result of plastic working being performed on a part of the joint portion 41.

Like the first embodiment, in a fixed portion 42 of the joint portion 41, the fixing portion 32 of the protective member 30 and the fixation portion 59 of the shield pipe 57 are both compressed in a radially inward direction such that their outer circumferential surfaces are recessed and their inner circumferential surfaces protrude. In the fixed portion 42, a recessed portion 43 of the outer circumferential surface of the shield pipe 57 and a protruding portion 44 of the inner circumferential surface of the protective member 30 are fitted to each other with a portion of the flexible shield member 58 sandwiched therebetween, and thus the recessed portion and the protruding portion are locked in the axial direction.

As described above, like the first embodiment, this embodiment includes the protective member 30 that surrounds the connection portion 40 between the flexible conductor 10 and the shape retaining conductor 52 and linearly holds the connection portion 40, and one end portion of the protective member 30 is fixed to an end portion of the shield pipe 57. Therefore, bending of the connection portion 40 between the flexible conductor 10 and the shape retaining conductor 52 can be prevented, and thus the connection portion 40 can be protected. Furthermore, an end portion of the flexible shield member 58 is fixed to the end portion of the shield pipe 57 together with the one end portion of the protective member 30, and therefore caulking does not need to be performed using a caulking ring or the like to connect the end portion of the flexible shield member 58 to the end portion of the shield pipe 57, and accordingly the number of parts and the number of man-hours can be reduced.

Other Embodiments

The present invention is not limited to the embodiments described above with reference to the drawings and, for example, the following embodiments are also included in the technical scope of the present invention.

(1) In the above embodiments, the protective member 30 has a linear shape, but this is not a limitation, and it is only required that the surrounding portion of the protective member that surrounds the connection portion has a linear shape. For example, the protective member may have a shape in which a portion other than the surrounding portion is bent (for example, L-shape).

(2) In the above embodiments, the protective member 30 is made of metal, but this is not a limitation, and the protective member may have a composite structure that includes a tubular portion that is made of metal and has a tubular shape surrounding the connection portion and an insulating portion that is made of a synthetic resin and covers an outer surface of the tubular portion, for example. The number of parts can be reduced with this configuration because the necessity of the insulating member can be eliminated while ensuring sufficient strength with the metal tubular portion.

(3) In the above embodiments, the fixed portion 42 is provided at one position of the joint portion 41, but this is not a limitation, and the fixed portion may be provided at two or more positions of the joint portion.

(4) In the above embodiments, the protective member 30 has a circular cross-sectional shape with a substantially constant diameter over the entire length thereof, but this is not a limitation, and the size of a cross section or the like of the protective member may be changed between portions. For example, the diameter may be changed between the surrounding portion and the fixing portion of the protective member.

(5) In the above embodiments, the flexible conductor 10 is a twisted wire conductor, but this is not a limitation, and the flexible conductor may be a conductor that is constituted by a braided wire obtained by braiding metal strands, for example.

(6) In the above embodiments, the shape retaining conductor 20, 52 is a pipe conductor constituted by a single hollow metal pipe or a single core conductor constituted by a single solid metal rod, but this is not a limitation, and the shape retaining conductor may be any conductor so long as it is hard and retains its shape.

(7) In the above embodiments, the protective member 30 is fixed to the shape retaining conductor 20 or the shield pipe 57 as a result of plastic working being performed on a portion in which the fixing portion 32 of the protective member 30 overlaps the fixation portion 24 of the shape retaining conductor 20 or the fixation portion 59 of the shield pipe 57, but this is not a limitation, and the means for fixing the protective member to the shape retaining conductor or the shield pipe can be freely changed.

(8) Although an exemplary shape of the shape retaining conductor-side connection portion 21, 54 is described in the above embodiments, the shape retaining conductor-side connection portion 21, 54 may have any shape so long as the shape allows for connection to the flexible conductor 10. For example, the shape retaining conductor-side connection portion 21, 54 may be formed so as to be arranged near the center of the shape retaining conductor 20, 52 in the radial direction or such that the center of the shape retaining conductor-side connection portion 21, 54 in the thickness direction substantially coincides with the center axis of the shape retaining conductor 20, 52. Alternatively, the shape retaining conductor-side connection portion 21 may be omitted and the shape retaining conductor 20 may be crimped to the flexible conductor 10 by inserting the flexible conductor 10 into the shape retaining conductor 20 and crushing the shape retaining conductor 20 in the radially inward direction.

List of Reference Numerals

10 Flexible conductor
20, 52 Shape retaining conductor
30 Protective member
33 Insulating member (insulator)
40 Connection portion
57 Shield pipe
58 Flexible shield member

The invention claimed is:
1. A wire harness comprising:
a flexible conductor that is flexibly bendable;
a shape retaining conductor comprising a hollow metal pipe that retains its shape, the hollow metal pipe having circumferential outer edges that converge at an end portion of the shape retaining conductor to form a flat surface that is substantially parallel to a longitudinal direction of the wire harness; and
a protective member that is made of metal, surrounds a connection portion between the flexible conductor and the flat surface of the shape retaining conductor, and holds the connection portion in the longitudinal direction of the wire harness, wherein one end portion of the protective member is fixed to an end portion of the shape retaining conductor.

2. The wire harness according to claim 1,
the wire harness further includes an insulator that surrounds the protective member, and
the insulator collectively covers entire lengths of the protective member and the shape retaining conductor.

3. A wire harness comprising:
a flexible conductor that is flexibly bendable;
a shape retaining conductor that retains its shape, the shape retaining conductor having circumferential outer edges that converge at an end portion of the shape retaining conductor to form a flat surface that is substantially parallel to a longitudinal direction of the wire harness;
a shield pipe through which the shape retaining conductor extends; and
a protective member that is made of metal, surrounds a connection portion between the flexible conductor and the flat surface of the shape retaining conductor and holds the connection portion in the longitudinal direction of the wire harness,
wherein one end portion of the protective member is fixed to an end portion of the shield pipe.

4. The wire harness according to claim 3, further comprising
a flexible shield that surrounds the flexible conductor,
wherein an end portion of the flexible shield is fixed to the end portion of the shield pipe together with the one end portion of the protective member.

* * * * *